United States Patent [19]

Rogers et al.

[11] Patent Number: 4,812,938
[45] Date of Patent: Mar. 14, 1989

[54] FLOPPY DISK LINER WITH IMPROVED CLEANING ABILITY

[76] Inventors: Randall J. Rogers, 300 Orchard St., Millis, Mass. 02052; Beth Z. Silverman, 296 Homer St., Newton, Mass. 02159; Armand F. Lewis, 15 Ocean View Ave., Mattapoisett, Mass. 02739

[21] Appl. No.: 64,415
[22] Filed: Jun. 18, 1987
[51] Int. Cl.$^4$ .................. G11B 23/03; B65D 25/30
[52] U.S. Cl. ........................... 360/133; 206/444
[58] Field of Search ............ 360/133, 137, 128, 97–99; 206/313, 444; 428/900

[56] References Cited

U.S. PATENT DOCUMENTS

| | | | |
|---|---|---|---|
| 3,668,658 | 6/1972 | Flores et al. | 360/133 |
| 4,251,843 | 2/1981 | Masuyama et al. | 360/133 |
| 4,354,213 | 10/1982 | Martinelli | 360/133 |
| 4,586,606 | 5/1986 | Howey | 206/444 |
| 4,610,352 | 9/1986 | Howey et al. | 206/444 |
| 4,655,348 | 4/1987 | Takagi | 360/133 |
| 4,680,661 | 7/1987 | Oishi | 360/133 |
| 4,709,816 | 12/1987 | Matsumoto et al. | 360/133 |
| 4,724,502 | 2/1988 | Buchwald et al. | 360/133 |

OTHER PUBLICATIONS

Petkiewicz et al., "Nonwovens as Liners for Floppy Disks," Nonwovens World, May–Jun. 1986, pp. 120–124.

Lewis et al., "Implications of Particulate Contamination in the Performance of Floppy Disks," paper presented at the 17th Annual Meeting of the Fine Particle Society Symposium, Jul. 28, 1986.

Tse et al., "Tribo-Acoustics of Nonwoven Fabric/Floppy Disk Dynamic Contact," dated Oct. 1986.

Primary Examiner—John H. Wolff
Assistant Examiner—Matthew J. Bussan

[57] ABSTRACT

An improved liner material for wiping debris from recording media to eliminate errors in the transmission of information with respect to the recording media. The liner material is a fibrous web which has fibrous surfaces and void volumes therein, the improvement being that the liner has at least one surface, with a fretting area of free vibratable fibers of at least 10% of the total surface, in contact with a surface of the recording media, and when vibrated against the recording media, and in contact with debris thereon, the free vibratable fibers impart energy to the debris causing the debris to move into the void volume of the liner, thus removing the debris from the recording media. The removal of debris from the recording media results in the error-free transfer of information from a recording transducer to and from a recording target media.

36 Claims, 4 Drawing Sheets

FLOPPY DISK LINER WITH IMPROVED CLEANING ABILITY

BACKGROUND OF THE INVENTION (1) Field of the Invention

This invention relates to a nonwoven liner material for wiping debris from a recording medium, more particularly to a material for wiping debris from magnetic media that is used in a computer diskette, the computer diskette being made up of a flexible magnetic recording disk contained in an envelope/jacket with a wiping fabric attached therein.

(2) Prior Art

The importance of nonwoven fabrics in computer diskettes has been recognized as being more than a protective fabric to minimize wear or abrasion of the magnetic media. The wiping action of the fabric is important to the function of the floppy disk medium which stores information for use in a computer disk drive. The wiping action of the fabric is also important because debris that may interfere with the information transfer at the read-write head of the computer disk drive, is ideally removed and entrapped by a wiping fabric. Debris originates from many sources such as: the diskette manufacturing process; the envelope itself; the action of the read-write head on the magnetic disk; the external environment; and, the abrasion of the magnetic disk, caused by abrasive fibers used in making nonwoven wiping fabrics.

While there is a demonstrated need for a wiping medium to keep the magnetic disk clean in order to reduce errors in the transmission of information onto or from a magnetic disk, the prior art does not indicate what characteristics are needed in a wiping fabric to perform this task.

The fabric that would perform such a task must be constructed in a manner so that the fibers used in the fabric would not themselves produce deleterious debris in the process of making or using the fabric. In addition, the fibers used therein should not be abrasive to the magnetic disk with which it would come in contact. If debris created by abrasion is not removed or if the wiping fabric abrades the magnetic disk so as to produce foreign particles then these foreign particles will impinge upon, or remove, the surface of the magnetic disk. Such abrasion or removal of the surface causes errors in the information that is being transferred from or onto a magnetic disk, and a misreading of the information takes place.

U.S. Pat. No. 3,668,658 discloses a magnetic record disk cover wherein any porous low friction anti-static material is used to wipe the surface of the magnetic media.

U.S Pat. No. 4,239,828 discloses a self-lubricating magnetic recording diskette, wherein a nonwoven porous tissue-like material is impregnated with a specific additive to wipe and lubricate the surface of the magnetic media to prolong the life of the disk.

U.S. Pat. No. 4,586,606 discloses a layered wiping fabric, having an inner layer of substantially thermoplastic material with an outer layer of textile length fibers.

U.S. Pat. No. 4,610,352 discloses the use of Nylon 6 fibers and the advantages of their use as the inner thermoplastic material in magnetic media wiping.

U.S. Pat. No. 4,591,521 discloses the use of a fusible spunbonded fibrous layer between the nonwoven wiping fabric and the plastic sheet comprising the outer jacket cover, the fibrous layer being present to enhance lamination of the liner to the outer sheet.

The aforementioned prior art fabrics function to remove debris from magnetic media but they do not remove the debris sufficiently so as to eliminate transmission errors from or onto a magnetic disk which are caused by particulate debris. The prior art does not sufficiently eliminate debris because the fabric liners do not have the factors that were found in the present invention.

The present invention has accomplished what the prior art has not by producing a 100% polyester liner that has far superior qualities in removing debris or particles from the surface of recording media than any prior art polyester liner.

SUMMARY OF THE INVENTION

An improved liner material for wiping debris from recording media to eliminate errors caused by particulate debris in the transmission of information with respect to the recording media. The liner is a fibrous web of polyester fibers, having fibrous surfaces and void volumes therein. The improvement is that the liner has at least one surface, with a fretting area of free vibratable fibers of at least 10% of the total surface, in contact with a surface of the magnetic media. When the free vibratable fibers are vibrated against a recording media during the operation of a computer disk drive, the fibers come into contact with debris thereon and impart energy to the debris. This imparted energy causes the debris to move into the liner, thus removing the debris from the recording media. The removal of debris from the recording media results in the error free transfer of information from a recording transducer to a recording target media.

It is an object of this invention to provide a diskette liner fabric having a fretting area of free vibratable fibers sufficient to remove debris from a flexible magnetic disk surface.

It is a further object of the invention to substantially reduce the frequency of error occurrences in the operation of floppy disks.

It is still a further object of this invention to provide a diskette liner that substantially removes debris from the surface of recording media more efficiently than prior art, thus eliminating the debris from the media surface.

BRIEF DESCRIPTION OF THE DRAWINGS

The objects and advantages of the present invention will become more apparent when viewed in conjunction with the following drawings in which.

DESCRIPTION OF THE PREFERRED EMBODIMENT

Figure 1:
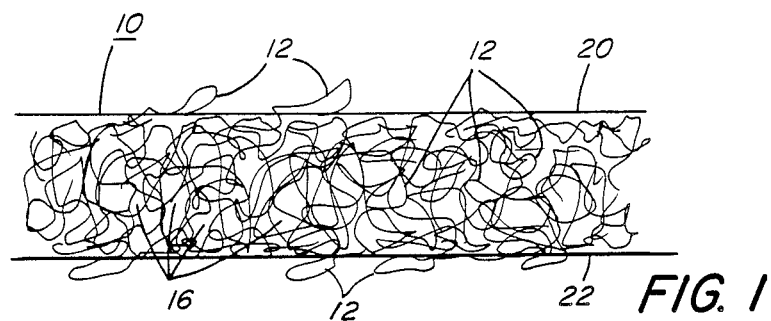
FIG. 1 is a side elevation view illustrating the present invention.
Figure 2:
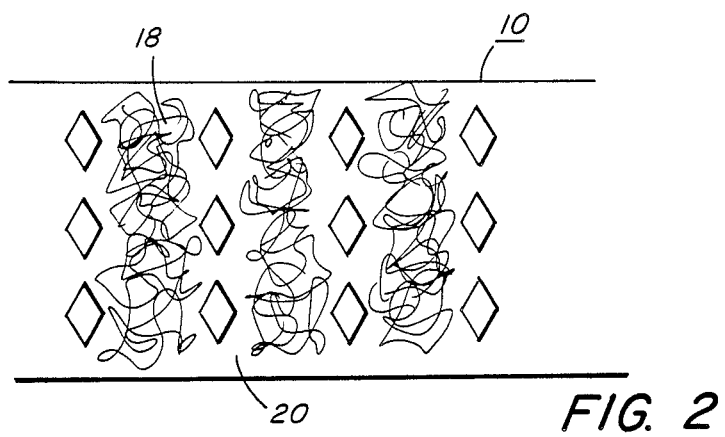
FIG. 2 plan view illustrating a portion of the fretting area on a surface of the present invention.

The present invention as shown in FIG. 1 is a cohesive nonwoven web 10 having polyester fibers 12, a first surface 20, a second surface 22, and void volumes 16 for use as a liner in a computer disk. As shown in FIG. 2, at least one surface 20 of the fabric 10 has a fretting area 18 of free vibratable fibers of at least 10% of the total surface 20. For the purpose of this specification free vibratable fibers are those fibers on a surface of a liner that vibrate when a disk is rotated. Although the preferred fibers are polyester, other fibers may be used if they exhibit the same characteristics when having the same percent fretting area. In addition, the preferred fiber should be hydrophilic.

Although the fabric should have a fretting area of at least 10% of free vibratable fiber, as shown in FIG. 1, the first surface 20 and the second surface 22 of the liner fabric 10 each may have a fretting area of between about 10% to 87%, with the preferred fretting area being 47%.

The fibers used in the liner material may consist of fibers having loops or fibers having free ends or any combination thereof.

In addition, the fibers used in the present invention may be crimped or straight fibers or any combination thereof. Although the fibers may have about 7 to about 14 crimps per inch of fiber, the preferred number of fiber crimps per inch of fiber is 11.

The polyester fibers used in the present invention may be selected from a group consisting of polyethylene terephthalate, polybutylene terephthalate, or any polyester fiber derived from the condensation of dicarboxylic acids with dialcohol, or any combination thereof.

Additionally other fibers may be selected from a group consisting of rayon, nylon, acrylic, polyolefin, cellulose, wool, cotton, polyacrylonitrile, polyvinylchloride, and polyamide, or combinations thereof.

It should be noted that the concept of percent fretting area was discussed by A. F. Lewis and Ming Kai Tse in "Tribology and Mechanics of Magnetic Storage Systems," Volume III, Bharet Bhushan and Norman E. Eiss, Ed., American Society of Lubrication Engineers, Publication SP-21, pp. 63-71, dated October 1986, herein incorporated by reference. The aforementioned article discussed the concept of fretting in the study of acoustic emission accompanying the rubbing of two surfaces, a nonwoven fabric against a floppy-disk magnetic media. A conclusion of the study was that the fretting area during the fibrous rubbing process was directly proportional to the acoustic energy emitted in the process. This study was thusly directed to the noise emitted during diskette operation. There was no mention or suggestion in the aforementioned study that the fretting area could be used in the removal of debris from a magnetic media surface.

It was unexpectedly found when experimenting and in the development of the present invention that free vibratable fibers in a fretting area of the present invention fabric could be effectively utilized to enhance the removal of debris from recording media. Prior to the experiments, those skilled in the art of making liners for computer diskettes were unaware that there was movement of fibers and that the movement of the fibers in a liner could be used to substantially increase the movement of the debris encountered on a magnetic media, thus removing the debris from a magnetic media surface. During the work with the present invention fabric liner it was observed that as the fretting area of a fabric was increased, the debris on a magnetic media was impacted upon by the free vibratable fiber so as to remove the debris from the media surface and move the debris into the voids of the fabric. With the debris being moved into the void volume of the fabric excellent cleaning of the surface of the magnetic media unexpectedly resulted. Such cleaning ability in a polyester fabric liner was unknown in the prior art. Because the present invention uses polyester fiber, not only will the liner have excellent cleaning characteristics but the liner will have all the qualities of polyester liners, such as low coefficient of friction; low diskette torque; no loose debris and highly stable dimensions, thus making the present invention far superior to all prior art polyester liner fabrics.

The present invention fabric is characterized as having a higher percent fretting area, as hereinafter defined, than prior art fabrics comprising 100% polyester fibers heretofore used as diskette liners.

Fretting area is defined for the purpose of this specification as the area on a liner fabric surface in which fibers vibrate during computer diskette operation. The vibrating fibers impart energy to foreign particles on a magnetic media, within the computer diskette, that they come into contact with. The energy imparted to foreign particles, as mentioned in a previous paragraph, enhances the removal or wiping of particles from the surface of magnetic media by moving these particles into the void volume of a fabric. This property is of great utility in flexible magnetic media information storage devices, because the removal or wiping of particles/debris from the surface of a magnetic disk within a diskette cartridge will result in the elimination of errors, caused by debris, in the transfer of information onto or from a magnetic disk.

Although the prior art is aware of a need for a wiping fabric to keep the magnetic media free from foreign particles, and more particularly, from magnetic dust in order to reduce errors in information transfer to and from recording media, the prior art has not taken into account factors that have become apparent in the development of the present invention. The prior art could not take these factors into account because the prior art was unaware of these factors and the combination thereof. Although each of the factors to be subsequently discussed will separately improve wiping of magnetic media, all other things being equal, the factors may be used in combination so that it is not necessary to obtain the extreme high or low values of all fabric properties simultaneously. Multiple regression analysis (MRA) shows that a superior wiping fabric results if the following factors are present in combination:

(1) coefficient of friction of magnetic media to liner greater than 0.29.
(2) percent fretting area greater than 10% of the fabric surface.
(3) water contact angle at zero degrees.

Thus, if the MRA is used, different combinations of the presented factors may be used with different fibers to arrive at optimum wiping for that particular fiber, so that, as in the present invention, superior wiping of debris from magnetic media is achieved. MRA is a mathematical technique as referenced in Statistics of Research by Shirley Dowdy and Stanley Wearder, published by John Wiley & Sons of New York in 1983, page 381 to page 422. MRA is used in this application to determine the extent to which each of the aforementioned factors are responsible for removal of particles.

The factors that have become apparent and which make the present invention superior to prior art liners are: increased coefficient of friction of liner to magnetic media; increased area of vibratable fibers on the surface of the liner; decreased stiffness of the fibers on the surface of the liner; decreased compressibility of the liner; increased hydrophilic surface finishes; and lower denier fibers. These factors must be present, as they are in the present invention, in proper combination, in a liner in order to cause more effective wiping of deleterious particles from the surface of magnetic media.

Figure 9:
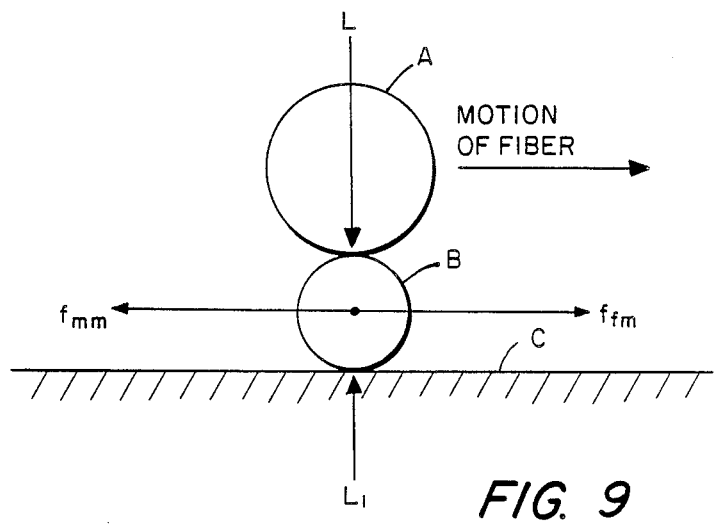
FIG. 9 is a cross-sectional view of a fiber and a piece of debris to illustrate the motion of the fiber and the movement of the debris when a fiber moves over a piece of debris on a magnetic media surface.

It was found in the development of the present invention that as the coefficient of friction of a liner to a magnetic media is increased, substantial wiping of debris occurs. In FIG. 9 there is shown a cross-sectional view of a cylindrical fiber A, moving over a spherical piece of magnetic media dust B, which is adhered to a media surface C. B and C are assumed to be of the same composition. The expressions, that follow are used to illustrate that as the liner-to-media coefficient of friction (COF) increases, particle B is more likely to move.

In FIG. 9, neglecting fiber weight, two frictional forces $f_{fm}$ and $f_{mm}$ act on the particle B since the loading L of fiber A on the particle B is the same loading L as that of the media C on the particle B. Therefore, the particle B will move if $$M^S_{mm} < M^D_{MF},$$

where $M^S_{mm}$ is the static media-to-media COF, and $M^D_{MF}$ is the dynamic fabric-to-media COF. From this, it follows the higher the fabric-to-media dynamic COF the higher the wiping force the fabric exerts on the particle. Furthermore, once the particle is wiped from the surface of the media, liners with high liner-to-media COF will have a greater propensity to retain media dust, thus reducing errors in the transmission of information from or to recording mediums.

The preferred liner-to-media COF is 0.35, but the COF may range between about 0.25 to about 0.9.

The following Table shows the coefficient of several commercial liners, but the table should not be limited to the liners illustrated because, only the most popular liners used as diskette liners are illustrated.

The commercial magnetic media (300 oe) in the following table is, made and sold by Minnesota Mining and Manufacturing Company, located in St. Paul, Minn.

TABLE I

Coefficient of friction (dynamic) of liners to a commercial magnetic media (300 Oe)

| | |
|---|---|
| Polyester | 0.265 |
| Polyacrylonitrile | 0.310 |
| Rayon/Polyester (50%/50%) | 0.310 |
| Rayon/Polypropylene (75%/25%) | 0.344 |
| 100% Rayon Surface | 0.353 |

In addition, it was found in the development of the present invention that by decreasing the fiber stiffness or increasing the compressibility of the fabric, the wiping of debris from the magnetic media would increase, because the fabric will conform better to the media, and more fibrous contact will be made between the media and the liner.

Additionally, it was further found that the use of fibers with a higher surface energy will improve the ability of a liner to remove debris from the surface of the magnetic media. This was concluded from classical surface chemistry arguments, e.g., when hydrophilic finishes are removed from the fibers, wiping of debris is poor.

The determination of the surface energies of fibers in a liner may be obtained from the water contact angle of the fiber. A water contact angle is related to surface energy. A water contact angle is defined as the angle formed between a drop of fluid and a planar surface. Surface energy is defined as the ability of one molecule to absorb another molecule at a surface. If a water contact angle is large, the liner is very hydrophobic and its surface energy is low. On the other hand, if the water contact angle is small, the surface is hydrophilic and the surface energies are higher. The desired case is that the surface energies be high and that the water contact angle be zero. When the water contact angle of the fiber is zero distilled water is absorbed immediately into the fiber upon contact. By removing surface finishes from a liner, it is possible to convert a high energy, low contact angle surface to a low energy, high contact angle surface. This transformation invariably results in poorer wiping and more errors.

It was also found, as stated previously, by increasing the percent of the surface of a fabric that has vibratable fibers better cleaning of debris takes place. This is because the vibrating fiber imparts, by a "beating" effect, more energy to debris on the media surface than can be imparted by stationary fibers. Observations show that in a 5.25" disk moving at 300 rpm, the fiber vibration frequency is 3.5 per second and the amplitude is 1-9 mils. A vibrating fiber thus exerts more wiping force than a stationary fiber. Thus, increasing the velocity of the wiping fiber, increases the wiping force. This was realized in the development of the preferred embodiment.

Figure 10:
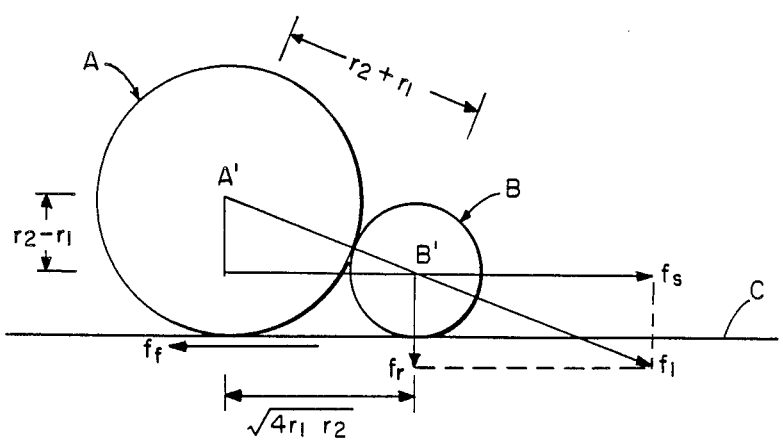
FIG. 10 is a cross-sectional view of a fiber and a piece of debris to illustrate the motion of the fiber and movement of debris on a media surface when a piece of spherical debris is impacted by a cylindrical fiber.

To illustrate the aforementioned, we now look at FIG. 10.

As shown in FIG. 10, for a cylindrical fiber A of radius $r_2$ and a spherical media debris particle B of radius $r_1$, the force $f_1$ on the media particle B will be exerted along the line $A^1B^1$ connecting the centers of the cylindrical fiber, A, and the spherical media, particle B. The angle, 0, of $f_1$ with respect to the media surface C is such that:

$$\sin 0 = \frac{r_2 - r_1}{r_2 + r_1} \text{ and } \cos 0 = \frac{\sqrt{4r_1r_2}}{r_2 + r_1}$$

This force, $f_1$, depends on the fiber mass and the fiber velocity relative to the particle, assuming the collision is perfectly elastic and momentum is conserved.

If $f_1$ is expressed as the sum of its vector components, there is a force $f_r$, as shown in FIG. 10, directed into the surface of the media given by $$f_r = f_1 \sin 0 = f_1 \left( \frac{r_2 - r_1}{r_2 + r_1} \right)$$

This in turn generates a frictional force, $f_f$, which opposes movement of the particle along the media surface.

The force, $f_f$ as is shown in FIG. 10, is given by:

$$f_f = f_r \mu = \mu f_1 \left( \frac{(r_2 - r_1)}{(r_2 + r_1)} \right)$$

Where $\mu$ is the coefficient of friction between particle B and the spherical media C. If B and C are of the same composition, $\mu$ is simply the media-to-media static coefficient of friction. The force directed along the media surface $f_s$, as shown in FIG. 10, tending to move the particle is given by $$f_s = f_1 \cos o = f_1 \frac{4r_1r_2}{r_2 + r_1}$$

The particle will move if $$f_s > f_f$$

$$\text{or} \left( \frac{f_1}{r_2 + r_1} \right) \sqrt{4r_1r_2} > \left( \frac{f_1}{r_2 + r_1} \right) \mu(r_2 - r_1)$$

This condition holds if $$r_1 > r_2 \left[ \frac{(2 + c) - \sqrt{4c + c^2}}{2} \right]$$

where $c = 4/\mu^2$.

The above equation requires that as the particle radius $r_1$ decreases, the fiber radius $r_2$ must also decrease in order to remove the particle B. Thus, if the particle radius is decreased, sucessively smaller fiber radii will be required to effect removal. The decrease of fiber radius $r_2$ discussed above allows the removal of ever smaller particles. Decreasing the fiber denier will decrease $r_2$, the fiber radius, and allow $r_1$ the particle size to be decreased. It is clear, therefore, that lower denier fibers will permit improved wiping of small particles. This is desirable in high density magnetic media where smaller particles are more likely to cause errors. The prior art has used fibers of only 1.5 denier and larger, while the preferred fiber denier of the present invention is 1.25. The present invention may use fiber deniers of between about 0.5 to about 1.25 depending on the requirements of the fabric.

Therefore, according to the derived formulae, as the fretting area of vibratable fibers is increased, $f_1$ is increased, and the result is a liner fabric that has excellent cleaning capabilities, such as the present invention.

Based on the aforementioned factors and derived formulaes, the present invention is far superior to the performance of any prior art fabric liner.

The present invention has the ability to remove deleterious particles from the surface of flexible magnetic media and thus substantially eliminate the frequency of missing bit errors. The present invention is superior to prior art fabrics which have been heretofore known and used in the art.

It is also well known in the computer industry that polyester fabrics, though widely used in 5.25" and 8" diskettes, are inferior wiping fabrics when compared with other prior art fabric.

To support this statement, a paper disclosed on July 28, 1986 [A. F. Lewis and R. J. Rogers, "Implications of Particulate Contamination in the Performance of Floppy Disks", presented at the 17th (seventeenth) Annual Meeting of the Fine Particle Society Symposium "Particles on Surfaces: Detection, Adhesion and Removal" July 28, 1986], is herein incorporated by reference. A method disclosed in this paper makes possible the delineation of which types of particles are most likely to cause errors and which liner types best remove the offending particles. The data disclosed in the aforementioned work clearly indicates that magnetic dust is the primary source of information transfer errors caused by particles. Such dust arises from the process of burnishing or smoothing the magnetic media surface and from wear of the disk by the magnetic head of the disk drive.

In addition, according to the aforementioned paper a method for evaluating the effectiveness of liner materials in wiping magnetic dust would consist of the following steps:

1. Diskettes are shown to be error-free by the use of a commercial error analysis device, such as the Cloutier FDAS Model 1200.
2. Diskette jackets, having fabric liner of the type under study, are prepared having one flap left open.
3. Media dust is generated by the use of an abrasive tape on a second disk of magnetic material under defined conditions.
4. The media dust thus generated is placed in measured amounts by a standard procedure on the previously error-free disks.
5. The disks of (4) are placed in the test jackets of (2).
6. The disks of (5) are tested for errors as in (1).

It was further disclosed in the aforementioned paper that liners consisting of 75% rayon and 25% polypropylene thermally bonded in a plurality of bond spots were superior to liners composed of 100% polyester identically bonded, and diskettes lined with either of these materials were superior to a diskette with no liner.

To further support the above statement that prior art polyester liners are inferior, a test was conducted. In this test three thousand open diskette jackets were prepared using standard manufacturing equipment. Of these, 1000 contained a rayon/polypropylene liner fabric, 1000 contained a liner fabric of 100% polyester having a fretting area of 7%, and 1000 contained the present invention liner fabric of 100% polyester fibers having a fretting area of 43%. Commercial magnetic media (300 Oe) was inserted into the jacket and the end flaps were closed and sealed by standard procedure. The media were then certified using a Media Logic Model 2000 made by Media Logic Corporation of Plainville, Mass., and a Teac Model 55B disk drive made by Teac Company of Japan. The error characterization curves, as shown in FIG. 4, were obtained for the liners.

Figure 4:
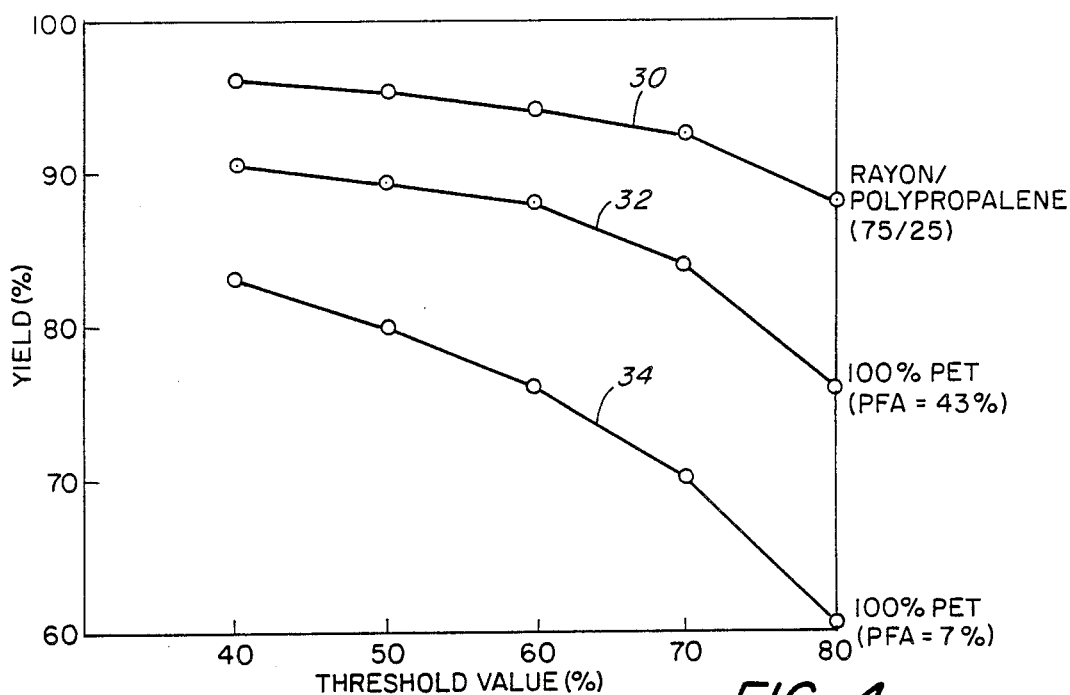
FIG. 4 a graph that illustrates the yields of good disks which are obtained with prior art liners and the present invention in uncontaminated disks prepared by conventional processes.

As illustrated in FIG. 4, the rayon/polypropylene liner 30 performed far superior to the prior art 100% polyester liner 34, but the present invention 32 of 100% polyester liner, made according to the theory of fretting area was markedly superior to the prior art for polyester liners. The percent threshold value, as shown in FIG. 4, is defined as the percent average track amplitude below which an error is recognized. The percent yield, as shown in FIG. 4, is defined as the percent of disks which are error-free when tested.

This test illustrates that prior art polyester liners are markedly inferior to other liner materials presently used in respect to their ability to remove magnetic particles. Nevertheless, polyester liners are predominantly used as liners to wipe debris from magnetic media because the polyester fibers used in the liners have a low coefficient of friction to magnetic media and hence a low diskette torque, thus requiring lower power disk drive motors to turn the diskette; they also have virtually no loose particulate debris associated with them; and they can be made to be highly dimensionally stable.

Figure 5:
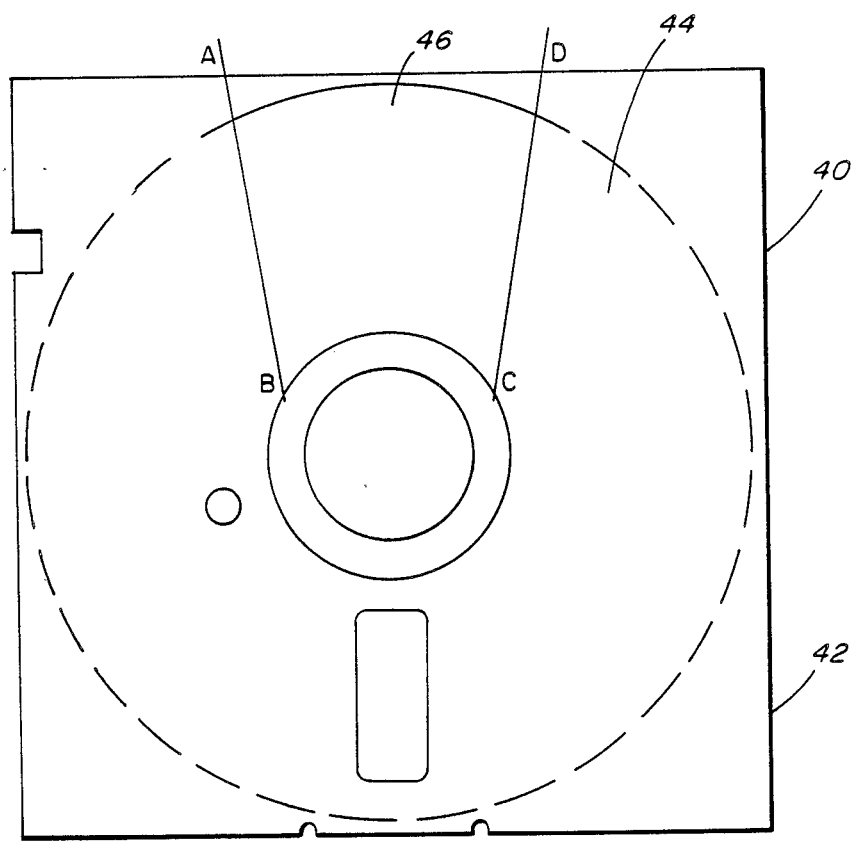
FIG. 5 illustrates a computer diskette with a section removed for viewing the inner liner through a rotatable transparent plastic disk.
Figure 8:
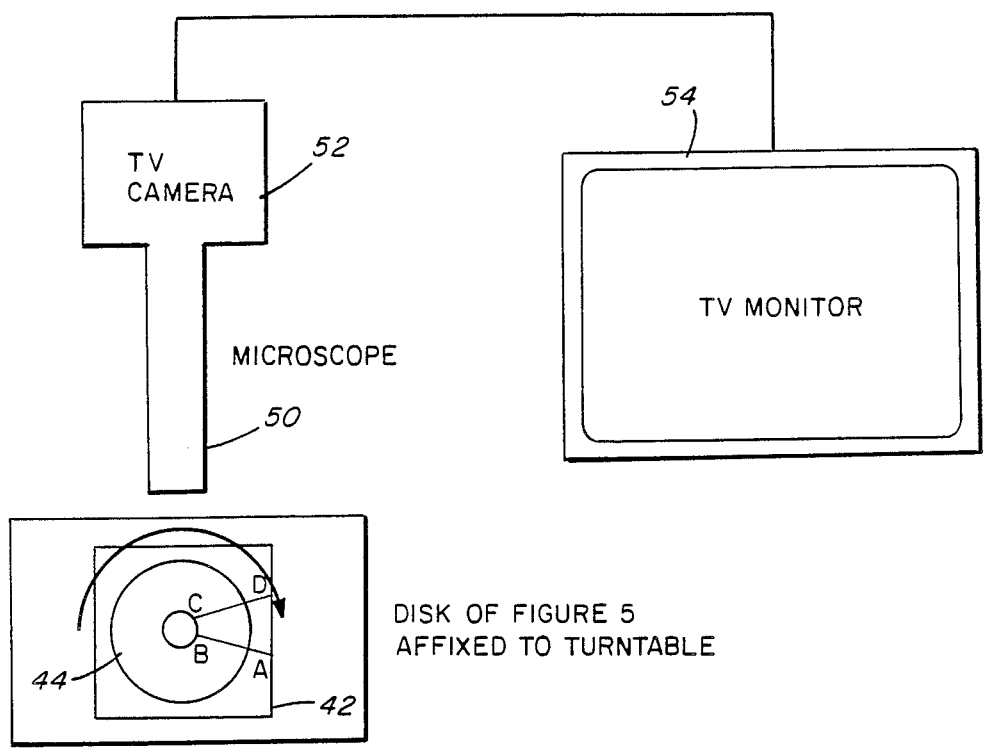
FIG. 8 is a diagram to illustrate the apparatus used for observing the PFA.

To determine or arrive at percent fretting area a test was conducted as follows: FIG. 5 shows a computer diskette 40 that was used to illustrate how the percent fretting area was determined. The diskette has a jacket 42 which is a standard 5.25" jacket lined with polyester fabric 44 with a section of the jacket ABCDA removed from one face of the envelope for viewing the fabric therein. In the test, a clear polyester disk 46 of a nominal thickness of 3 mils is rotated at 300 rpm by the use of a turntable to which the jacket 42 has been affixed. As shown in FIG. 8, the motion of the liner is then observed at a microscope 50 with a magnification and a television camera 52 which is directed upon the opening ABCDA in the jacket 42, at the rotating clear disk, and onto the surface of the liner 44. The minimum field of view observed is 0.375 square inches at a magnification of 55X. This motion is then observed via a TV monitor 54.

In testing fabrics composed of different fibers, it was observed that although the jacket and liner were stationary, the rotation of the disk induced vibration in the fibrous structure. The vibrating fibers did not cover the entire area of the liner, but only part of it. The area covered by the fibers vibrating as seen on the TV monitor when divided by the total area of the liner visible on the monitor defines the percent fretting area (PFA).

The PFA was unexpectedly found to be a significant enhancement to wiping media surfaces and a previously unknown characteristic of diskette liners.

The use of percent fretting area is a distinct breakthrough in the ability of liners to remove debris from recording media.

Figure 3:
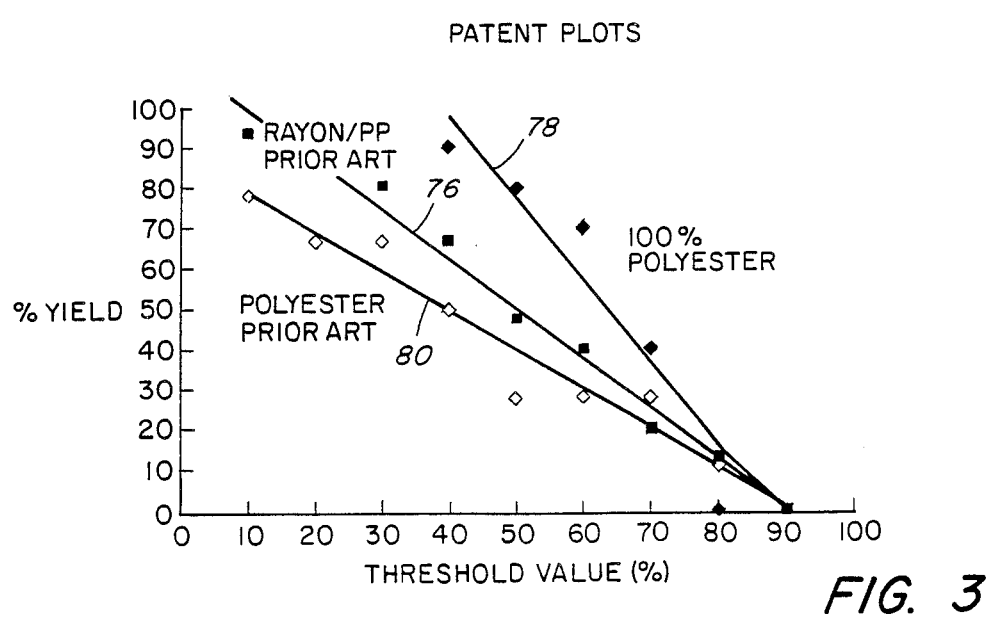
FIG. 3 is a graph that illustrates the percent yield and threshold values of prior art liners and the present invention, when magnetic media is contaminated with error causing particles/debris.
Figure 6:
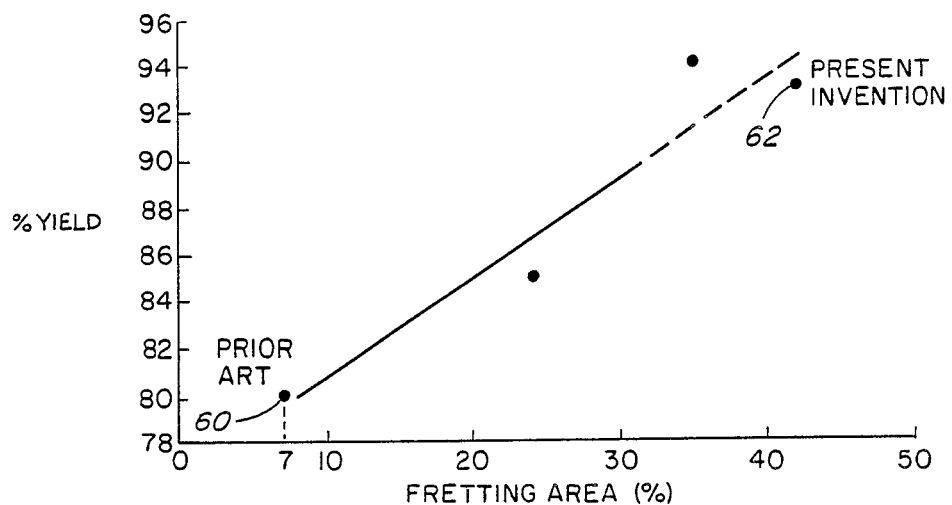
FIG. 6 is a graph that illustrates the relationship between percent fretting area (PFA) and percent yield for 100% polyester liner.

This was further observed as shown in the graph of FIG. 6, wherein a prior art liner 60 and the present invention 62 having a single polyester fiber blend were prepared, and tested. It was found that they had different PFAs by the previously mentioned test. The highest PFA observed during the tests among commercial prior art polyester liners was 7%, whereas the PFA for the present invention was 47%. It became apparent in light of the data disclosed that to improve the wiping of magnetic particles and to decrease the frequency of errors made of the transfer of information from or onto record media, the PFA should be increased. The present invention, due to the increase in percent fretting area, far exceeded the prior art in the removal of debris from magnetic media. In addition, when the disks mentioned previously in Step (5) are subjected to error characterization analysis, the results, as shown in FIG. 3, were obtained. As illustrated in FIG. 3, a rayon/polypropylene liner 76, as typically used in the prior art has a fretting area of 20%, while the present invention, a 100% polyester liner 78, has a fretting area of 43%, and another prior art liner of 100% polyester with a 7% fretting area. This graph is used only to illustrate the differences between a typical liner and the present invention. A graph such as in FIG. 3 is typically obtained by applying the method of least squares to 20 contaminated diskettes. The method of least squares is a means of choosing a line, on a graph, which bests fits the experimental data to arrive at an intercept. This analysis typically gives an intercept I for each liner. An intercept is defined as the extrapolated threshold value at which the yield of errorless disks derived from the contamination experiment would be 100% if other imperfections beside contamination were not present. This intercept I is used to characterize the ability of liners to remove magnetic dust, a primary cause of diskette errors. The yield on the graph in FIG. 3 is defined as the percent of error-free disks tested. The threshold value, as is shown in FIG. 3, is the percent average track amplitude below which an error is recognized.

The following Table covers liner types presently in use.

TABLE II

| I VALUES OF COMMERCIAL LINERS USING 3M MAGNETIC MEDIA | |
|---|---|
| 1. No Liner | −Infinity |
| 2. Polyester (100%) | −12.3 |
| 3. Acrylic (100%) | −8.5. |
| 4. 75% rayon/25% polypropylene | +8.1 |
| 5. 50% rayon/50% polyester | +25 |
| 6. 100% rayon | +36 |
| 7. Polyester (100%) present invention | +35 |

Note: For a perfect liner I = 100

To further explain the present invention an example is given. The example is not intended to limit the scope of the present invention except as to the following claims.

EXAMPLE

Figure 7:
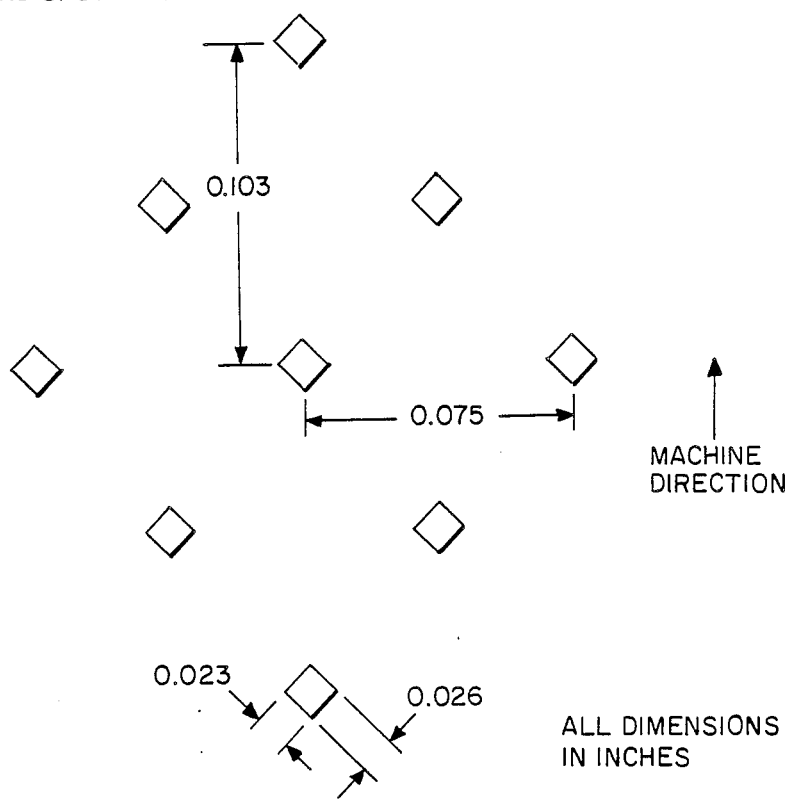
FIG. 7 illustrates a typical bond pattern of the present invention.

A homogeneous blend of polyester fibers such as Eastman Type 411, 1.5 denier, 1.5 inches long and Celanese Type 450, 3.0 denier, 1.5 inches long is formed by standard methods and via carding is formed into a fibrous web. This web is thermally spot bonded by passing it between two heated identical rollers pressed together with a force of 100 lbs. per inch of width of the rollers. The pattern of engraving of the rollers is helical, the land areas of said rollers form an acute angle of 50° with respect to the projection of the cylindrical axis on the surface of the roll. The engraving pattern of the rollers comprises a multiplicity of alternating land and groove areas having a width of 0.028 inch and 0.036 inch, respectively. When the roller's surface speed is 200 feet per minute and the roller's surface temperature is 430° F. a typical bond pattern produced, is as shown in FIG. 7. This pattern has 256 bond spots per square inch and a non-bonded area of 87%. This observed bonded area is smaller than that predicted from the size of the land areas of the rollers. This fabric, having a basis weight of 25 g/yd$^2$, has, after being formed into a diskette by standard means, and tested by the aforementioned test method of determining PFA, was found to have a PFA of 43%, thus making the present invention an excellent liner for cleaning debris from magnetic media.

Although the preferred bonding is by heat and pressure, other types of bonding such as by chemicals, entangling, needling, and ultrasonic energy may be used with slightly different results.

Alternative embodiments of the invention are also evident. Using the fiber blend specified above, the PFA can be shown to be a function of the bonded areas, the temperature of bonding and the crimp of the fibers. The following equation was derived to illustrate this.

PFA=A (BA)+B (bonding temperature)+C (Crimp)+D, where BA is the bonded area of the fabric, bonding temperature is the surface temperature of the rollers, crimp is the number of crimps per inch of the fiber, and D is a constant.

For the fiber blend mentioned above
A= −2.13
B= −0.75
C= +2.2
D=397.4

Thus, to get an increase of 1% in the PFA of the above fabric one of the following criteria has to be met:

Criteria

Decrease the bonded area by 0.47%;
Decrease the roller temperature by 1.33° F.;
Increase the crimps per inch in the fiber by 0.45.

Similarly derived equations may be used to determine the PFA of different fibers or blend of fibers. For example, a web composed entirely of fibers made by DuPont, located in Wilmington, Del., as D171, having 1.5 denier, 1.5 inches, is bonded at 371° F. with the roller configuration of the preferred embodiment, would have a PFA of 15%.

What is claimed is:

1. An improved linear material for wiping debris from a recording media to eliminate errors in transmission of information with respect to said recording media, said linear being a cohesive nonwoven web having fibrous surfaces and void volumes therewithin, the improvement comprising:
   at least one surface of said linear contactable with a surface of the recording media, said liner surface having a fretting area of free vibratable fibers comprising at least 10% of said surface, said free vibratable fibers, when vibrated against the surface of said recording media and in contact with said debris, imparting energy thereto causing said debris to move into said void volume of said linear removing said debris from the recording media,
   wherein the free vibratable fibers within said fretting area are fibers having a crimped structure of a selected number of crimps formed along the length of the fibers for improving the debris-removing property of said fibers.

2. The linear material of claim 1 wherein the fretting area of said free vibratable fibers may comprise about 10% to about 87% of the area of said linear surface.

3. The liner material of claim 1 wherein the liner has a first and second surface.

4. The linear material of claim 3 wherein the first and second surfaces each have a fretting area of between about 10% to about 87%.

5. The liner material of claim 1 wherein the crimped free vibratable fibers have between about 7 to about 14 crimps per inch of fiber.

6. The liner material of claim 1 wherein the free vibratable fibers are selected from a group comprising polyethylene terephthalate, polybutylene terephthalate or any polyester fibers derived from the condensation of dicarboxylic acids with dialcohol, or combinations thereof.

7. The liner material of claim 1 wherein the free vibratable fibers are selected from a group consisting of: rayon, nylon, acrylic, polyamide, polyolefin, cotton, wool, cellulose, polyacrylonitrile, and polyvinylchloride or combinations thereof.

8. The liner material of claim 1 wherein the fibers have a substantially hydrophilic surface to absorb distilled water instantaneously.

9. The liner material of claim 1 wherein the fibers have a coefficient of friction between said recording media and said liner of about 0.25 to about 0.9.

10. The liner material of claim 1 wherein the fibers have a denier of between about 0.5 to about 1.25.

11. An improved linear material for wiping debris from a recording media to eliminate errors in transmission of information with respect to said recording media, said liner being a cohesive nonwoven web having at least one layer of fibers having fibrous surfaces and void volumes therewithin, the improvement comprising:
   said fiber being bonded together in a plurality of recessed discrete bonding points; and
   at least one surface of said linear contactable with a surface of the recording media, said linear surface having a fretting area of free vibratable fibers comprising at least 10% of said surface, said free vibratable fibers, when vibrated against the surface of said recording media and in contact with said debris, imparting energy thereto causing said debris to move into said void volume of said linear removing said debris from the recording media,
   wherein the free vibratable fibers within said fretting area are fibers having a crimped structure for a selected number of crimps formed along the length of the fibers for improving the debris-removing property of said fibers.

12. The liner material of claim 11 wherein the fibers may have a range of between about 7 to about 14 crimps per inch of fiber.

13. The liner material of claim 11 wherein said fretting area comprises a proportion of said liner surface in a range between about 10% to about 87%.

14. The liner material of claim 11 wherein said liner has a first and a second surface.

15. The liner material of claim 14 wherein said first and second surfaces each has a fretting area of between about 10% to about 87%.

16. The liner material of claim 11 wherein the fibers have a substantially hydrophilic surface to absorb distilled water instantaneously.

17. The liner material of claim 11 wherein the fibers have a coefficient of friction between said recording media and said liner of about 0.25 to about 0.9.

18. The liner material of claim 11 wherein the fibers have a denier of between about 0.5 to about 1.25.

19. The liner material of claim 11 wherein the free vibratable fibers are selected from a group comprising polyethylene terephthalate, polybutylene terephthalate or any polyester fibers derived from the condensation of dicarboxylic acids with dialcohol, or combinations thereof.

20. The liner material of claim 11 wherein the free vibratable fibers are selected from a group consisting of: rayon, nylon, acrylic, polyamide, polyolefin, cotton, wool, cellulose, polyacrylonitrile, and polyvinylchloride or combinations thereof.

21. A recording medium comprising a jacket, a magnetic disk, and an improved nonwoven linear having at least one layer of fibers bonded together, said linear being a cohesive nonwoven web having fibrous surfaces and a void volume therewithin, the improvement comprising:
  at least one surface of said linear contactable with a surface of the magnetic disk, said linear surface having a fretting area of free vibratable fibers comprising at least 10% of said surface, said free vibratable fibers, when vibrated against the surface of said magnetic disk and in contact with said debris, imparting energy thereto causing said debris to move into said void volume of said liner removing said debris from the magnetic disk,
  wherein the free vibratable fibers within said fretting area are fibers having a crimped structure of a selected number of crimps formed along the length of the fibers for improving the debris-removing property of said fibers.

22. The liner material of claim 21 wherein the fibers may have a range of between about 7 to about 14 crimps per inch of fiber.

23. The liner material of claim 21 wherein said fretting area comprises a proportion of said liner surface in a range between about 10% to about 87%.

24. The liner material of claim 21 wherein said liner has a first and a second surface.

25. The liner material of claim 24 wherein said first and second surfaces each has a fretting area of between about 10% to about 87%.

26. The liner material of claim 21 wherein the fibers have a substantially hydrophilic surface to absorb distilled water instantaneously.

27. The liner material of claim 21 wherein the fibers have a coefficient of friction between said recording media and said liner of about 0.25 to about 0.9.

28. The liner material of claim 21 wherein the fibers have a denier of between about 0.5 to about 1.25.

29. The liner material of claim 21 wherein the free vibratable fibers are selected from a group comprising polyethylene terephthalate, polybutylene terephthalate or any polyester fibers derived from the condensation of dicarboxylic acids with dialcohol, or combinations thereof.

30. The liner material of claim 21 wherein the free vibratable fibers are selected from a group consisting of: rayon, nylon, acrylic, polyamide, polyolefin, cotton, wool, cellulose, polyacrylonitrile, and polyvinylchloride or combinations thereof.

31. An improved linear material for wiping debris from a recording media to eliminate errors in transmission of information with respect to said recording media, said linear being a cohesive nonwoven web of fibers having fibrous surfaces and void volumes therewithin, the improvement comprising:
  at least one surface of said liner contactable with a surface of the recording media, said linear surface having said fibers bonded together at a plurality of recessed discrete bonding points, and having a fretting area other than at said bonding points of free vibratable fibers in contact with the surface of the recording media, said free vibratable fibers when vibrated against the surface of said recording media and in contact with said debris, imparting energy thereto causing said debris to move into said void volume of said linear removing said debris from the recording media,
  wherein said linear surface has the characteristics of said fretting area of said free vibratable fibers constituting about 10% to 87% of the are of said linear surface, a coefficient of friction of contact with said surface of the recording media of about 0.25 to 0.9, and a wear contact angle of substantially zero degrees.

32. An improved linear according to claim 31, wherein said fretting area is about 43% of the area of said linear surface.

33. An improved linear according to claim 31, wherein said coefficient of friction is about 0.35.

34. An improved linear according to claim 31, wherein the free vibratable fibers within said fretting area are fibers having looped ends.

35. An improved linear according to claim 31, wherein the free vibratable fibers within said fretting area are fibers having free ends.

36. An improved linear according to claim 31, wherein the free vibratable fibers within said fretting area are crimped fibers having a crimped structure of a selected number of crimps formed along the length of the fibers for improving the debris-removing property of said fibers.

* * * * *